United States Patent [19]

Bergles

[11] Patent Number: 4,651,853
[45] Date of Patent: Mar. 24, 1987

[54] MULTI-SPEED GEAR HUB FOR A BICYCLE

[75] Inventor: Eduard Bergles, Graz, Austria

[73] Assignee: Fichtel & Sachs AG, Schweinfurt, Fed. Rep. of Germany

[21] Appl. No.: 790,735

[22] Filed: Oct. 24, 1985

[30] Foreign Application Priority Data

Nov. 2, 1984 [DE] Fed. Rep. of Germany ....... 3440069

[51] Int. Cl.$^4$ .......................... B60K 41/26; F16H 3/44
[52] U.S. Cl. .................................. 192/6 A; 74/750 B; 74/781 B
[58] Field of Search .......................... 74/750 B, 781 B; 192/6 A

[56] References Cited

U.S. PATENT DOCUMENTS

| 3,113,652 | 12/1963 | Schwerdhofer | 192/6 A |
|---|---|---|---|
| 3,194,089 | 7/1965 | Schwerdhofer | 74/750 B |
| 4,059,028 | 11/1977 | Schulz et al. | 74/750 B X |
| 4,179,953 | 12/1979 | Hanada et al. | 74/750 B |

FOREIGN PATENT DOCUMENTS

| 2533308 | 2/1977 | Fed. Rep. of Germany . |
|---|---|---|
| 1399442 | 7/1975 | United Kingdom . |
| 1582796 | 1/1981 | United Kingdom . |
| 2136515 | 9/1984 | United Kingdom . |

Primary Examiner—Allan D. Herrmann
Attorney, Agent, or Firm—Toren, McGeady and Goldberg

[57] ABSTRACT

The bicycle gear hub constructed particularly as a five-speed hub with a back-pedalling brake comprises a single planetary transmission (27), of which the internal gear (55) and the planet carrier (29) can be coupled through ratchet locking mechanism (83, 89) alternately with a drive sleeve (81) which is axially displaceable upon shifting of the gears of the gear hub and which is intended to be coupled to a drive sleeve (81) coupled to a driver (11). The internal gear (55) comprises a control shoulder (93) for alternate controlling of the two ratchet locking mechanisms (83, 89). A further ratchet locking mechanism (71) which connects the internal gear (55) to the hub sleeve (7) is controlled by the axial movement of the internal gear (55). The planet carrier (29) is coupled to the hub sleeve (7) through a constantly engaged ratchet locking mechanism (67). The ratchet locking mechanisms (83, 85) provided on the drive sleeve (81) comprise both detents for transmitting the forwards torque and also of the back-pedalling torque. The planetary transmission (27) is constructed as a stepped gearing and comprises two sun wheels (57, 59) adapted to be coupled alternately to the hub shaft (1) and which mesh with correspondingly stepped planet wheels (49). Despite the large number of gears and the integrated back-pedalling brake, the gear hub is of compact construction.

15 Claims, 6 Drawing Figures

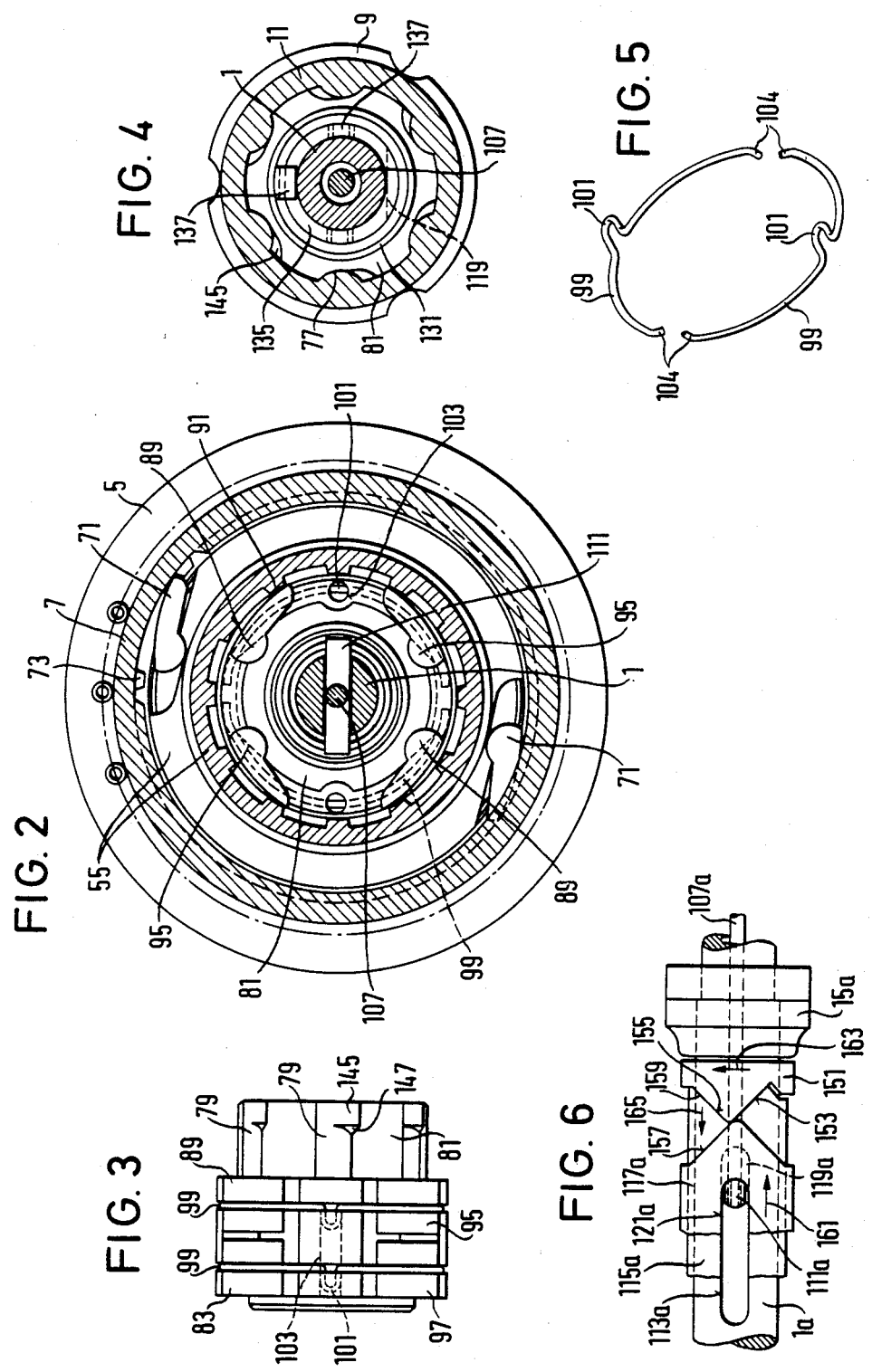

MULTI-SPEED GEAR HUB FOR A BICYCLE

The invention relates to a multi-speed gear hub for a bicycle or the like and in particular a gear hub having a back-pedalling brake device.

Known from German Published Specification No. 25 33 308 is a three-speed drive hub, of which the driver, carrying the driving pinion, can for changing gears be coupled alternately either to the planet carrier of a planetary transmission or to the internal gear of the planetary transmission. For alternate coupling, a control ring is provided which is axially displaceable on the hub shaft and which connects the driver through dog couplings to the planet carrier or the internal gear. The drive hub comprises a back-pedalling brake device, the brake cone of which is mounted on the planet carrier. The known drive hub requires comparatively considerable axial switching travel on the port of the control ring which results in comparatively large dimensions of the drive hub, particularly if it is desired to increase the number of gears.

The object of the invention is to provide a multi-speed gear hub for a bicycle or the like, the axial length of which is comparatively small. It is intended particularly that the gear hub be equipped with a back-pedalling brake device and preferably have more than three speeds. Within the framework of the invention, the multi-speed gear hub comprises a hub shaft, a driver mounted to rotate on the hub shaft and a hub sleeve mounted to be rotatable on the driver on the one hand and on the hub shaft on the other. Disposed within the hub sleeve is a single planetary transmission of which the planet carrier is axially fixed but is rotatable on the hub shaft. The planetary transmission further comprises, connected in rotationally rigid fashion to the hub shaft, a sun wheel and an internal gear adapted for axial displacement between a first position and a second position and also a plurality of planet wheels meshing with the sun wheel and the internal gear and mounted on the planet carrier. Rotationally rigidly but axially displaceably coupled to the driver is a driver sleeve. The driver sleeve is displaceable between three positions and when moving between its second and its third positions, it entrains the internal gear between the first and second positions thereof. For changing of gears and for coupling of the driver and of the hub sleeve, only ratchet-type locking mechanisms are provided. The ratchet locking mechanisms are controlled as a function of the shift movement of the driver sleeve and of the internal gear of the planetary transmission. A first constantly acting ratchet locking mechanism couples the planet carrier to the hub sleeve. A second ratchet locking mechanism couples the internal gear, in the first position of the latter, to the hub sleeve and is disengaged in the second position of the internal gear. A third ratchet locking mechanism couples the driver sleeve in its first position with the planet carrier and is disengaged in the second and third positions of the driver sleeve. A fourth ratchet locking mechanism finally couples the driver sleeve in its second and third positions to the internal gear and is disengaged in the first position of the driver sleeve. In order to control the disengageable ratchet locking mechanism, there are, axially alongside the ratchet tooth system, in each case annular control shoulders which, according to the axial relative position of the ratchet teeth and of the ratchet carrier of the ratchet locking mechanism, act upon the detents held on the ratchet carrier either to engage them into or keep them disengaged from the ratchet teeth. The gear hub is controlled by a control element which is axially displaceable in the hub shaft and which is coupled to the driver sleeve.

In order to minimise costs of construction, the driver sleeve is expediently constructed as a common ratchet carrier for detents of the third and of the fourth ratchet locking mechanism. The previously mentioned control edges for disengaging the third and fourth ratchet locking mechanism are expediently provided on the internal gear so that the third and the fourth ratchet locking mechanism can be alternately disengaged.

The gear hub may comprise a single sun wheel which is constantly and rotationally rigidly connected to the hub shaft. As a rule, such a gear hub only has three gears. More than three gears, for example five gears, can be achieved without any substantial axial enlargement of the hub in that the planet wheels are constructed as stepped wheels having at least two different tooth pitch circles, the hub shaft having rotatably mounted on it at least two sun wheels each of which meshes with one of the stepped wheels. In order to change the transmission ratio of the planetary gearing, a coupling device is provided via which optionally one of the sun wheels can be rotationally rigidly connected to the hub shaft. In the case of two sun wheels, this can be easily achieved in that there is on the hub shaft at least one coupling projection or coupling dog and in that the sun wheels are adapted for displacement along the hub shaft so that the sun wheels can be alternately engaged with the coupling projection.

Examples of embodiment of the invention will be explained in greater detail hereinafter with reference to the accompanying drawings, in which:

FIG. 2 is a cross-section through the gear hub shown in FIG. 1 viewed along a line II—II in FIG. 1;

FIG. 3 is a side view of a driver sleeve of the gear hub which is used as a ratchet carrier;

FIG. 4 shows a cross-section through the gear hub viewed along a line IV—IV in FIG. 1;

FIG. 5 is a perspective view of spring elements which are used for fixing detents on the driver sleeve in FIG. 3, and FIG. 6 is a partial side view of an alternative embodiment of control device which can be used for controlling the planetary transmission in the gear hub shown in FIG. 1.

Figure 1:
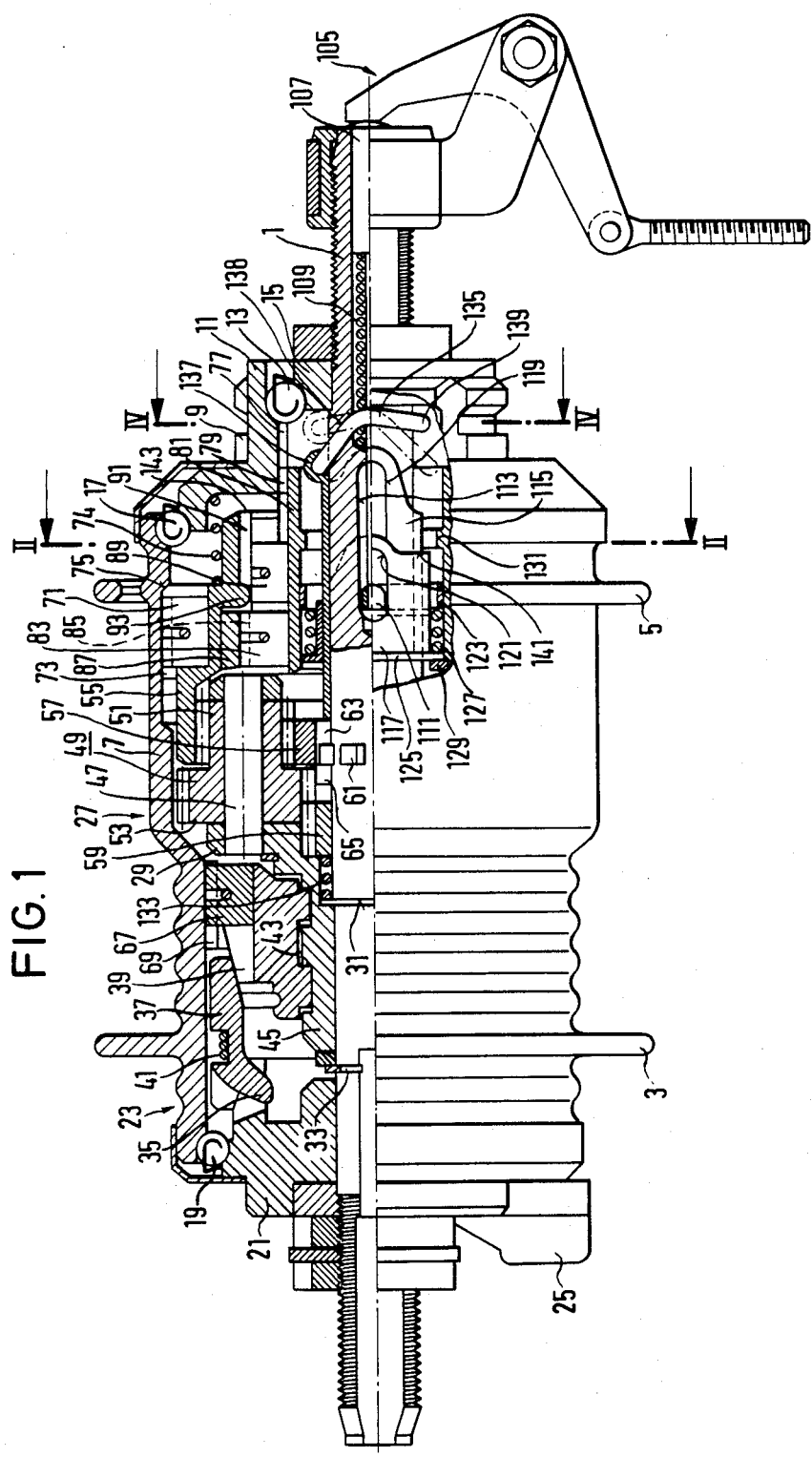
FIG. 1 is a partial axial longitudinal section through a five speed gear hub with back-pedalling brake device for a bicycle.

FIGS. 1 and 3 show a five speed gear hub with a hub shaft 1 intended to be mounted in conventional manner on the frame of the bicycle, a hub sleeve 7 provided with spoke flanges 3, 5 and a driver 11 provided with a system of teeth 9 for fitment of at least one chain wheel not shown in greater detail. The driver 11 is mounted via a ball race 13 for rotation on a bearing cone 15 which is fitted on the hub shaft 1. The end of the hub sleeve 7 which is towards the driver is mounted for rotation via a ball race 17 on the driver 11 while its other end is rotatably mounted on a lever cone 21 through a ball race 19. The lever cone 21 is mounted on the hub shaft 1 and carries a brake lever 25 which absorbs the reaction torque from a back-pedalling brake device generally designated 23, dispersing it to the bicycle frame.

Axially between the back-pedalling brake device 23 and the driver 11 there is inside the hub sleeve 7 a planetary transmission 27, the planet carrier 29 of which is used for controlling the back-pedalling brake device. The planet carrier 29 is rotatably mounted on the hub shaft 1 and is axially fixed between an axial shoulder 31 and a locking ring 33. A brake housing 37 rotationally rigidly but radially movably coupled to the lever cone 21 by dogs 35 is, upon a rotation of the planet carrier 29 in the back-pedalling direction, displaced by a brake cone 39 axially towards the brake casing 37, opening up the brake casing 37 against the force of a spring 41 which seeks to contract the brake casing 37 radially. To this end, the brake cone 39 is guided by a steep screwthread 43 on a shank part 45 of the planet carrier 29 and, in the event of a back-pedalling movement, is screwed towards the brake casing 37 so that the latter is applied against the hub sleeve 7 and brakes the hub sleeve 7.

The planetary transmission 27 comprises a plurality of planet wheels 49 each of which is mounted for individual rotation on spindles 47 of the planet carrier 29 which are parallel with the hub shaft 1, each planet wheel comprising two axially adjacently located stepped wheels 51, 53 having different pitch circle diameters. The smaller-diameter stepped wheel 51 is provided on the side which is towards the driver 11 and meshes with the internal teeth of an internal gear 55. Each of the two stepped wheels is furthermore in constant engagement with one of two sun wheels 57, 59 mounted in both rotatable and also axially displaceable manner on the hub shaft 1 and which can be alternately coupled with coupling dogs 61 projecting radially from the hub shaft 1 so that one of the two sun wheels 57, 59 is at all times rotationally rigidly connected to the hub shaft while whichever is the other sun wheel is free to rotate. The larger-diameter sun wheel 57 associated with the smaller stepped wheel 51 carries radially inwardly projecting coupling dogs 63 intended to be coupled with the coupling dogs 61. The smaller-diameter sun wheel 59 has axial coupling dogs 65 by which it is axially braced on the sun wheel 57 and is adapted to be coupled together with the coupling dogs 61. In order to facilitate shifting of the sun wheels 57, 59, chamfered lead-ins can be provided on the free ends of the coupling dogs 65.

The driving connections between the driver 11, the planet carrier 29, the internal gear 55 and the hub shaft 7 are made solely via ratchet locking mechanisms in order to shorten the lengths of shift travel involved and thus the overall axial length of the gear hub. The first ratchet locking mechanism comprises a plurality of detents 67 which are distributed in a peripheral direction and which are mounted to be pivotable axially parallel with the hub shaft 7 on the brake cone 39 which is at the same time used as a ratchet carrier, the said detents 67 being springingly pretensioned in a system of ratchet teeth 69 on the hub shaft 7. The detents 67 are constantly in engagement with the ratchet teeth 69 and are able to transmit from the planet carrier 29 to the hub sleeve 7 a driving torque in a forwards direction of rotation. The internal gear 55 is guided for axial displacement and is constructed on its outside as a ratchet carrier for a plurality of (in this case two) detents 71 of a second ratchet locking mechanism, the said detents 71 being likewise pretensioned to pivot axially parallel with the hub shaft 1 and with a springing action into ratchet teeth 73. The internal gear 55 is axially displaceable between two positions and is pretensioned by a thrust spring 74 into the first position shown in FIG. 1 in which the detents 71 are free to engage into the ratchet teeth 73. The internal gear 55 can in a manner to be explained in greater detail hereinafter be axially displaced towards the driver 11 against the force of the spring 74, the detents 71 being held out of the ratchet teeth 73 by an annular control edge 75 of the hub shaft 7, adjacent the ratchet teeth 73. In this second position of the internal gear 55, the second ratchet locking mechanism is disengaged.

The driver 11 carries internally cut teeth 77 engaged by a system of externally cut teeth 79 on a drive sleeve 81 which is in this way rotationally rigidly but axially displaceably coupled to the driver 11. On its outer periphery, while utilising the externally cut teeth 79, the drive sleeve 81 is constructed as a ratchet carrier for axially adjacently disposed sets of detents of a third ratchet locking mechanism and of a fourth ratchet locking mechanism. The third ratchet locking mechanism comprises two diametrically opposite detents 83 which are pivotable axially parallel with the hub shaft 1 and which engage with a springing action into ratchet teeth 85 on the inner periphery of a toothed ring 87 mounted on the spindles 47 of the planet carrier 29. The fourth ratchet locking mechanism comprises, disposed on the side of the detents 83 which is towards the driver 11, detents 89 which are pivotable axially parallel with the hub shaft 1 on the drive sleeve 81 being pretensioned to engage with a springing action into internally cut teeth 91 of the internal gear 55.

The drive sleeve 81 is, in a manner to be described in greater detail hereinafter, displaceable in relation to the internal gear 55 so that an annular control shoulder 93 which is adjacent that end of the internally cut teeth 91 of the internal gear 55 which is axially adjacent the detents 83 acts upon the detents 83 and 89 of the third and fourth ratchet locking mechanism respectively in such a way as alternately to release them for or restrain them from engaging with the relevantly associated ratchet teeth 85, 91.

The previously explained detents 67, 71, 83 and 89 are operative in the direction of forward drive of the driver and inoperative in the reverse direction of rotation. For transmission of back-pedalling torque when operating the back-pedalling brake device 23, the fourth ratchet locking mechanism has in addition to the detents 89 further detents 95 which are operative in the reverse direction of rotation and which, as FIG. 2 shows, are likewise pretensioned into the ratchet teeth 91 of the internal gear 55 which for the purpose is constructed as a double-ratchet tooth system. The detents 95 are likewise controlled by the control collar 93 in the same way as the detents 83. In the same way, the third ratchet locking mechanism also and in addition to the detents 83 comprises detents 97 for transmitting the back-pedalling torque (FIG. 3). The detents 89 and 95 of the fourth ratchet locking mechanism and also detents 83 and 97 of the third ratchet locking mechanism are disposed in each case in pairs approximately diametrically opposite each other and are in each case fixed in pairs on the drive sleeve 81 by substantially semi-circular spring segments 99 which are not shown in greater detail in FIG. 5. The spring elements have axially angled-over arcuate lugs 101 which, as FIG. 3 shows, engage into axial bores 103 of the drive sleeve 81, fixing the spring element 99 to this latter. As usual with ratchet locking mechanisms of bicycle drive hubs, the spring elements 99 are engaged in slots of the ratchet locking mechanism on the one hand and the detents on the other, at the same time fixing the detents axially on the drive sleeve. The end zones of the spring elements 99 are, as shown at 103, bent over radially inwardly to improve guidance in the slots and to prevent the spring elements moving out of the slots.

The gear position of the transmission hub is controlled via a control lever generally designated 105 by a control switch or the like, not shown in greater detail. The control lever 105 acts on the freely accessible end of a shift pin 107 guided for axial displacement in a bore in the hub shaft 1 and passing under the driver 11, being pretensioned by a spring 109 away from the planetary transmission 27. At its end which is towards the planetary transmission 27, the shift rod 107 comprises a drive block 111 which emerges through a radial slot 113 in the hub shaft 1. Guided for axial displacement on the hub shaft 1 is a shift sleeve 115, on which a driver sleeve is disposed for displacement in relation to the shift sleeve 115. The driver block 111 emerges radially outwards through slots 119 in the shift sleeve 115 or slots 121 in the driver sleeve 117 and is connected to a driver ring 123 which is axially displaceable within the drive sleeve 81 and which encloses the shift sleeve 115 and the driver sleeve 117. Between the driver ring 123 and an annular flange 125 which projects radially outwardly from the driver sleeve 117 there is a thrust spring 127. The annular flange 125 of the driver sleeve 117 can, on the side which is towards the planetary transmission 27, bear on a locking washer 129 on the drive sleeve 81. On the axially oppositely disposed side, the drive sleeve 81 is provided with an annular collar 131 against which the driver ring 123 abuts as it moves towards the driver 11.

The shift sleeve 115 permits of switch-over of the sun wheels 57, 59 of the planetary transmission 27 independently of the shift position of the shift rod 107. The sun wheels 57, 59 are pretensioned towards the driver 11 by an axially biased thrust spring 133 clamped between the smaller-diameter sun wheel 59 and the planet carrier 29. At the end of the shift sleeve 115 which is adjacent the driver 11 is a pivotally mounted control ring 135 adapted for movement about an axis 137 (FIGS. 1 and 4) which extends substantially tangentially of the shift sleeve 115. The control ring 135 constitutes a thrust reversing rocker, the middle portion 137 of which is braced on the bearing cone 15 while its end 139 which is opposite the articulation 137 projects into the path of a control edge 141 of the driver sleeve 117. By means of the control ring 135, it is possible to reverse the movement of the driver sleeve 17 which is towards the fixed cone 15 into an oppositely directed movement of the shift sleeve 115.

During the ensuing explanation of the mode of operation of the five-speed hub, the reference to a leftwardly directed movement of a component must be understood as meaning its movement to the back-pedalling brake device 23 or the lever cone 21 thereof, while a rightwardly directed movement must be understood as a movement directed towards the driver 11 or fixed cone 15. FIG. 1 shows the five-speed hub in the shift position for fifth gear (high speed gear). In this position, the control lever 105 is pressing the shift rod 107 against the force of the spring 109 and into the extreme left-hand position, in which the driver block 111 is bearing on the left-hand end of the slot 121 of the driver sleeve 117. The ring flange 125 of the driver sleeve 117 bears on the blocking ring 129 and the drive sleeve 81 is in its extreme left-hand position in which the detents 83, 97 of the third ratchet locking mechanism engage the ratchet teeth 85 of the toothed ring 87 which is connected to the planet carrier 29. The internal gear 55 is in its extreme left-hand position and the annular collar 93 lifts the detents 89, 95 of the fourth ratchet locking mechanism out of the ratchet teeth 91 of the internal gear 55, in other words disengages the fourth ratchet locking mechanism. The driver block 111 is furthermore bearing on the left-hand end of the slot 119 of the shift sleeve 115. In this position, the shift sleeve 115 which bears on the sun wheel 57 maintains the sun wheel 57 engaged with the coupling dogs 61 against the force of a spring 133. The detents 71 of the second ratchet locking mechanism are engaged in the extreme left-hand position of the internal gear 55.

In the shift position for fifth gear, the torque flow passes from the driver 11 via the drive sleeve 81, the detents 83 of the third ratchet locking mechanism, the toothed ring 87, the planet wheels 49 braced on the sun wheel 57 to the internal gear 55 and thence via the detents 71 of the second ratchet locking mechanism to the hub sleeve 7.

In the fourth gear position (next-to-high-speed gear), the shift rod 107 is eased off rightwards by one position. In this shift position, the driver sleeve 117 which is braced on the driver ring 123 via the spring 127 maintains the drive sleeve 81 in the position shown in FIG. 1. Similarly, the spring 74 maintains the internal gear 55 in the position shown in FIG. 1. The spring 133, on the other hand, moves the sun wheels 57, 59, entraining the shift sleeve 115 rightwards into a position in which the sun wheel 57 is disengaged from the coupling dogs 61 while the sun wheel 59 is rotationally rigidly connected to the hub shaft 1 through the coupling dogs 61. The torque flux of the fourth gear in turn extends from the driver 11 through the drive sleeve 81, the detents 93 of the third ratchet locking mechanism, the toothed ring 87, the planet wheels 49 to the internal gear 55 and thence through the ratchets 71 of the second ratchet locking mechanism to the hub shaft 7. In contrast to the fifth gear, though, the planetary transmission is no longer supported through the entire sun wheel 57 on the hub shaft 1 but through the smaller-diameter sun wheel 59 and its associated larger-diameter stepped wheels 53.

In order to engage third gear (direct drive), the shift rod 107 is moved another position to the right. During this movement, the drive block 111, through the driver ring 123 abutting the annular collar 131, moves the drive sleeve 81 out of its extreme left-hand position into a midway position between the three positions of the drive sleeve 81. Since the internal gear 55 is still being held in the left-hand position by the spring 74, the shift condition of the third and of the fourth ratchet locking mechanisms will change. The shift shoulder releases the detents 89, 95 of the fourth ratchet locking mechanism for engagement into the rathcet teeth 91 of the internal gear 55 and disengages the third ratchet locking mechanism in which it lifts the detents 83, 97 out of the ratchet teeth 85. The spring 133 maintains the sun wheel 59 in engagement with the clutch dogs 61 of the hub shaft 1. In the third gear position, the torque flux passes from the driver 11 through the drive sleeve 81, the detents 89 of the fourth ratchet locking mechanism to the internal gear 55 and thence through the detents 71 of the second ratchet locking mechanism to the hub sleeve 7.

To engage second gear (next-to-bottom climbing gear), the shift rod 107 is moved yet one more position onwards to the right. The driver block 111 entrains the drive sleeve 81 via the driver ring 123, shifting in into its extreme right-hand position. During this movement, the detents 89, 95 of the fourth ratchet locking mechanism strike a shoulder 143 which defines the ratchet teeth 91 on the side axially opposite the control shoulder 93 and, during this phase of the switching movement, move the internal gear 55 from the extreme left-hand position into the extreme right-hand position against the action of the spring 74. In the extreme right-hand position, the control edge 75 disengages the second ratchet locking mechanism in that it lifts the detents 71 out of the ratchet teeth 73. In this shift position, too, the spring 133 maintains the sun wheel 59 in engagement with the coupling dogs 61 of the hub shaft 1. The torque flow of the second gear extends from the driver 11 via the drive sleeve 81, the detents 89 of the fourth ratchet locking mechanism, the internal gear 55, the planet wheels 49 braced on the sun wheel 59, to the planet carrier 29 and thence via the brake cone 39 and the detents 67 of the first ratchet locking mechanism to the hub shaft 7.

To engage first gear (bottom climbing gear), the shift rod 107 is moved into its extreme right-hand position. During this shifting movement, the driver block 111 bears on the right-hand end of the slot 121 of the driver sleeve 117 and entrains the driver sleeve 117 against the force of the spring 127 which is biased on the drive sleeve 81 through the driver ring 123 towards the end 139 of the control ring 135. The control ring 135 reverses the thrust movement of the driver sleeve 117 into an oppositely directed thrust movement of the shift sleeve 115 which in turn moves the sun wheels 57, 59 into their extreme left-hand position against the force of the spring 133. By this shifting movement, the sun wheel 59 is disengaged from the hub shaft 1 and the sun wheel 57 is rotationally rigidly coupled to the hub shaft 1. The shift position of the drive sleeve 81 and of the internal gear 55 remains unaltered in comparison with second gear. The flow of torque passes in first gear from the driver 11 through the drive sleeve 81, the detents 89 of the fourth ratchet locking mechanism to the internal gear 55 and thence through the planet wheels which are now braced on the larger sun wheel 57 to the planet carrier 29 and thus via the brake cone 39 and the detents 67 of the first ratchet locking mechanism to the hub shaft 7. The back-pedalling brake device 23 is operated by reverse rotation of the driver 11.

In the event of reverse rotation of the driver 11, regardless of the shift position of the shift rod 107, the drive sleeve 81 is turned in the reverse direction at the same time. According to the shift position of the shift rod 107, the detents 97, 95 of the third and fourth ratchet locking mechanism, inoperative during forwards rotation, become engaged. In the fifth-gear shift position shown in FIG. 1, the detents 97 of the third ratchet locking mechanism are engaged while the detents 95 of the fourth ratchet locking mechanism are disengaged. The torque flow during braking in this gear position passes from the driver 11 through the drive sleeve 81, the detents 97 and the toothed ring 87 directly to the planet carrier 29 which moves the brake cone 39 axially towards the brake casing 37 via the steep screwthread 43. By virtue of the reverse direction of movement, the detents 67, 71, 83 and 89 are inoperative.

When a braking movement occurs in fourth gear, the flow of torque passes correspondingly directly to the planet carrier 29 since, in comparison with fifth gear, only the bracing on the sun wheels 57, 59 which is not vital to the braking process will have altered. In the third (direct) gear, the detents 83, 97 of the third ratchet locking mechanism are disengaged and the detents 89, 95 are cleared for engagement in the ratchet teeth 91. Upon reverse rotation of the driver 11, the flow of torque for actuation of the back-pedalling brake device 23 passes from the driver 11 through the drive sleeve 81, the detents 95 to the internal gear 55 and thence through the stepped wheel 51 which is braced on the sun wheel 59 to the planet carrier 29 which operates the brake device 23. The planetary transmission 27 is, during braking, operative in a transmitting sense, which increases the attainable braking torque. The same torque flow also occurs in second gear (next-to-bottom climbing gear).

When braking in first gear (bottom gear), the flow of torque passes from the driver 11 through the drive sleeve 81, the detents 95 to the internal gear 55 and thence from the stepped wheel 51 which is now braced on the sun wheel 57, to the planet carrier 29 which actuates the brake device 23.

In any of the shift positions of the gear hub, the back-pedalling brake device 23 is actuated either directly or through the power-assisting effect of the planetary transmission.

FIGS. 3 and 4 show further details of the drive sleeve 81. The externally cut teeth 79 on the drive sleeve 81, provided for engagement with the internally cut teeth 77 on the driver 11, are at their end which is towards the driver 11 provided with widenings 145 on the teeth grooves which merge into the slots through chamfers 147 which extent obliquely to the axis. These widened portions 145 ensure that even with incomplete shift positions, reliable connection is established between the driver 11 and the internal gear 50 which is coupled to the driver 11 via the third or fourth ratchet locking mechanism. The oblique faces 147 shift the drive sleeve 81 axially towards the planetary transmission 27 and so ensure that the detents 83, 97 are cleared from the control shoulder 93 and can engage the ratchet teeth 85. The angle of inclination of the oblique faces 147 is expediently around 45° in relation to the axis of rotation. The grooves of the externally cut teeth 79 of the drive sleeve 81 form at the same time the bearing pockets for the pairwise diametrically opposite detents 83, 89, 95 and 97. In order to improve the bearing capacity of the externally cut teeth 79, there are distributed over the periphery six grooves of which only four are utilised for accommodating the detents.

FIG. 6 shows an alternative form of thrust reversal control by means of which the transmission ratio of the planetary transmission 27 of the gear hub can be changed over when shifting from second to first gear. To explain the construction and mode of action, reference is made to the description of FIGS. 1 to 5, parts which function in the same way being identified by the same reference numerals with the addition of the letter a in order to ensure differentiation.

The reversing device has, disposed rotatably on the hub shaft 1a, and axially between the fixed cone 15a and the shift sleeve 115a, a control ring 151 which is braced axially on the fixed cone 15a and which has on the side pointing towards the shift sleeve 115a and the driver sleeve 117a thrust faces 153, 155 which extend obliquely towards each other in a peripheral direction. The driver sleeve 117a and the shift sleeve 115a are provided with complementary thrust faces 157, 159 respectively, which co-operate in each case with one of the thrust faces 153, 155 on the control ring 151. During the switch-over from second to first gear, the driver sleeve 117 is displaced in the direction of an arrow 161 onto the control ring 151 which is rotated in the direction of an arrow 163 over the thrust faces 153, 157 as they slide on one another, pushing the shift sleeve 115a in the opposite direction, designated by an arrow 165, over the oblique faces 155, 159 as they slide on one another.

I claim:

1. Multi-speed gear hub for a bicycle or the like, comprising
   (a) a hub shaft (1)
   (b) a driver (11) mounted to rotate on the hub shaft (1),
   (c) a hub sleeve (7) mounted to be rotatable on the driver (11) on the one hand and on the hub shaft (1) on the other,
   (d) disposed within the hub sleeve (7), a single planetary transmission (27) of which the planet carrier (29) is axially fixed but rotatable on the hub shaft (1), the planetary transmission (27) further comprising, connected in rotationally rigid fashion to the hub shaft (1), sun wheels (57, 59) and an internal gear (55) adapted for axial displacement between a first position and a second position, and a plurality of planet wheels (49) meshing with the sun wheels (57, 59) and the internal gear (55) and mounted on the planet carrier (29),
   (f) a first ratchet locking mechanism (67, 69) for coupling the planet carrier (29) to the hub sleeve (7),
   (g) a second ratchet locking mechanism which couples the internal gear (55), in the first position of the latter, to the hub sleeve (7) and which is disengaged in the second position of the internal gear (55),
   (h) a third ratchet locking mechanism (83, 85) which couples the driver sleeve (81), in its first position, to the planet carrier (29) and which is disengaged in the second and third positions of the driver sleeve (81),
   (i) a fourth ratchet locking mechanism (89, 91) which couples the driver sleeve (81) with the internal gear (55) in the second and third positions of the driver sleeve (81) and which is disengaged in the first position of the driver sleeve (81),
   (k) a control element (107) which is coupled to the driver sleeve (81) and which is guided for axial displacement in the hub shaft (1).

2. A multi-speed gear hub according to claim 1, characterised in that the third (83, 85) and fourth (89, 91) ratchet locking mechanisms are disposed axially adjacent each other and in that the driver sleeve (81) is constructed as a common ratchet carrier for detents (83, 89) of the third (83, 85) and of the fourth (89, 91) ratchet locking mechanism, and in that the internal gear (55) has annular control edges (93) which alternately disengage the detents (83, 85) of the third (83, 85) and of the fourth (89, 91) ratchet locking mechanism.

3. A multi-speed gear hub according to claim 1 or 2, characterised in that the planet wheels (49) are constructed as stepped wheels (51, 53) having at least two different tooth pitch circles, the hub shaft (1) having rotatably mounted on it at least two sun wheels (57, 59) each of which meshes with one of the stepped wheels (51, 53), a coupling device (61, 63, 65) being provided for optional rotationally rigid coupling of one of the sun wheels (57, 59) to the hub shaft (1).

4. A multi-speed gear hub according to claim 3, characterised in that two sun wheels (57, 59) are guided for axial displacement on the hub shaft (1) and are adapted to be alternately coupled to at least one coupling projection (61) projecting from the hub shaft (1).

5. A multi-speed gear hub according to claim 4, characterised in that one of the sun wheels (57) has radial dogs (63) for coupling with the coupling projection (61), the second sun wheel (59) having axial dogs (65) projecting towards the first sun wheel (57).

6. A multi-speed gear hub according to claim 4, characterised in that the sun wheels (57, 59) are disposed axially between a shift sleeve (115) guided for axial displacement on the hub shaft (1) and a spring (133) which biases the sun wheels (57, 59) axially towards the shift sleeve (115) and in that the control element (107) which is guided for displacement in the hub shaft (1) is also coupled to the shift sleeve (115) through a driver arrangement (111, 117, 127, 123), the sun wheels (57, 59) being displaced axially over the shift sleeve (115) outside of the control path of the control element (107) which controls the first, second and third positions of the driver sleeve (81), and against the initial tension of the spring (133).

7. A multi-speed gear hub according to claim 6, characterised in that the driver arrangement (111, 117, 123, 127) has, connected to the control element (107) and extending outwards radially through a slot (113, 119) in the hub shaft (1) and the shift sleeve (115), a control block (111) coupled via a compensating spring (127) to the driver sleeve (81) and in that the axial length of the slot(119) in the shift sleeve is equal to the control path of the control element (107) which comprises the first, second and third positions of the driver sleeve (81).

8. A multi-speed gear hub according to claim 7, characterised in that the control block (111) is connected via the compensating spring (127) to a driver sleeve (117) which is adapted for axial displacement over the displacement path between two adjacent positions of the driver sleeve (81) in relation to the control block (111) and in that the driver sleeve (117) for its part is displaceable in relation to the driver sleeve (81) between two end positions spaced apart by the distance between two adjacent positions of the driver sleeve (81).

9. A multi-speed gear hub according to claim 8, characterised in that on that side of the shift sleeve (115) which is axially remote from the sun wheels (57, 59) there is a thrust reversal transmission (135, 151) which, when the control path of the control element (107) which includes the first, second and third positions of the driver sleeve (81) is exceeded, converts a movement of the driver sleeve (117, 117a) which is away from the sun wheels (57, 59) into a movement of the shift sleeve (115, 115a) which tends to lead towards the sun wheels (57, 59).

10. A multi-speed gear hub according to claim 9, characterised in that the thrust reversing gearing has enclosing the hub shaft an angle lever ring (135) which has a lever arm articulated on the shift sleeve (115), its knee zone (137) being capable of being braced against a support face rigid with the hub shaft while its other lever arm has an abutting face (139) for the driver sleeve (117).

11. A multi-speed gear hub according to claim 9, characterised in that axially fixed alongside the shift sleeve (115a) and the driver sleeve (117a) is a thrust ring (151) which is rotatably mounted on the hub shaft (1a) and in that the shift sleeve (115a) and the driver sleeve (117a) are rotationally rigid on the hub shaft (1a) and have extending obliquely to the peripheral direction oblique faces (157, 165) which bear on matching oblique faces (153, 155) on the thrust ring (151).

12. A multi-speed gear hub according to one of claims 1 or 2, characterised in that on the side of the planetary transmission (27) which is axially remote from the driver (11) and adapted to be actuated via the planet carrier (29) there is inside the brake sleeve a backpedalling brake device (23) and in that the third (83, 85) as well as the fourth (89, 91) ratchet locking mechanism each comprise two sets of detents (83, 97 and 89, 95) respectively, of which in each case one is operative in the direction of forwards rotation while the other is operative in the direction of rearwards rotation of the driver.

13. A multi-speed gear hub according to claim 12, characterised in that the detents of the two sets of detents (83, 97 and 89, 95) are staggered in a peripheral direction but are disposed in one plane and are held in pockets (79) on the outer periphery of the driver sleeve (81) by a plurality of spring elements (99) each of which spans a part of the periphery.

14. A multi-speed gear hub according to claim 13, characterised in that for the two sets of detents (83, 97 and 89, 95) of the third and of the fourth ratchet locking mechanisms, there are in each case provided two substantially semicircular spring elements (99), each of which has an axially bent-over curved member (101) which engages an axial bore (103) in the driver sleeve (81).

15. A multi-speed gear hub according to one of claims 1 or 2, characterised in that the driver sleeve (81) has externally cut teeth (79) while the driver (11) has internally cut teeth (77) engaging the externally cut teeth (79) and in that the ends of the externally cut teeth (79) which are axially towards the driver (11) engage with greater clearance in a peripheral direction into the internally cut teeth (77) than those zones which are farther removed from the driver (11).

* * * * *